Aug. 24, 1954   V. H. MATTHEWS   2,686,990
METHOD OF HORTICULTURAL SPRAYING OR DUSTING
Filed June 2, 1949   4 Sheets-Sheet 1
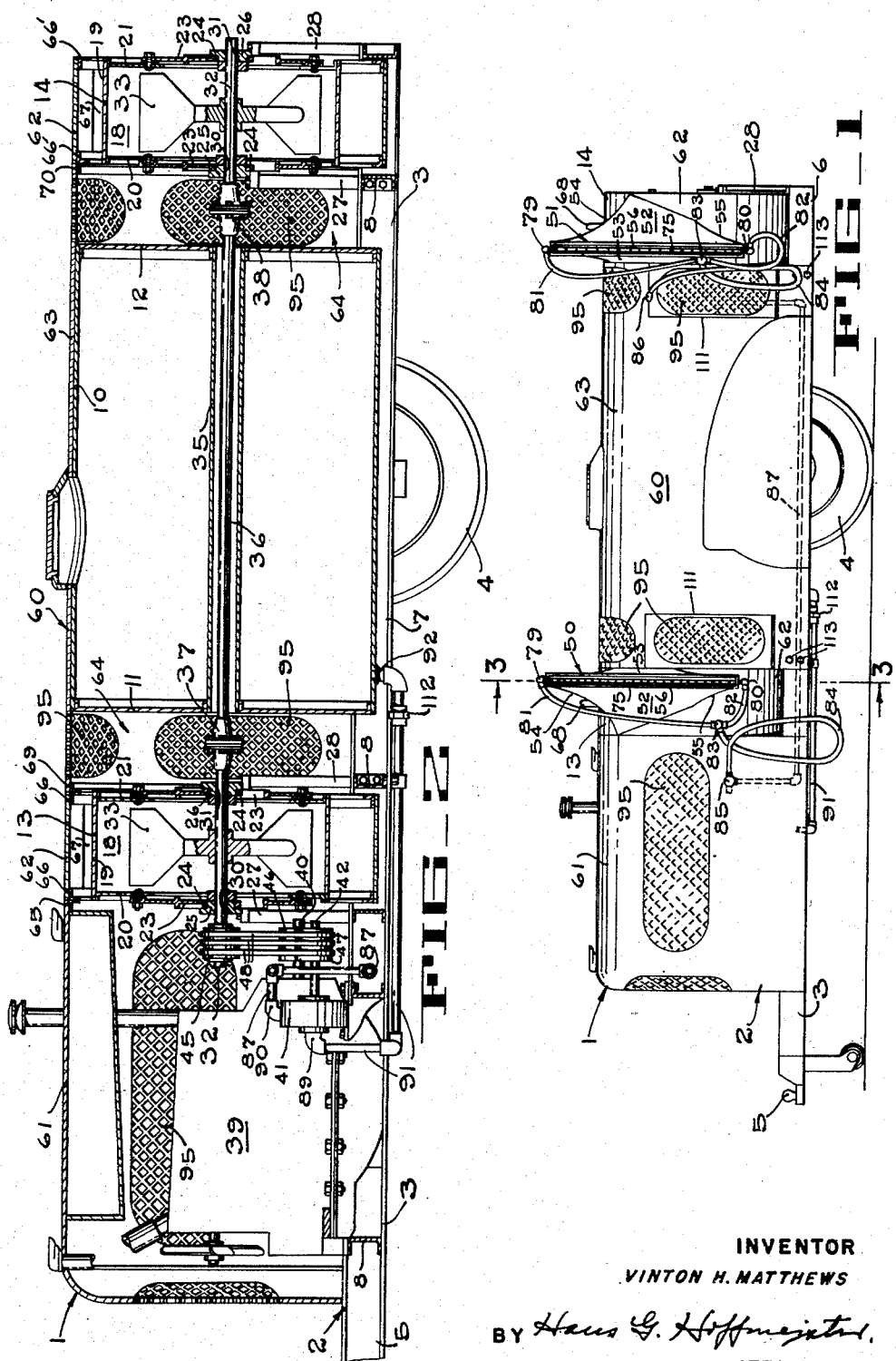
INVENTOR
VINTON H. MATTHEWS
BY Hans G. Hoffmeister
ATTORNEY

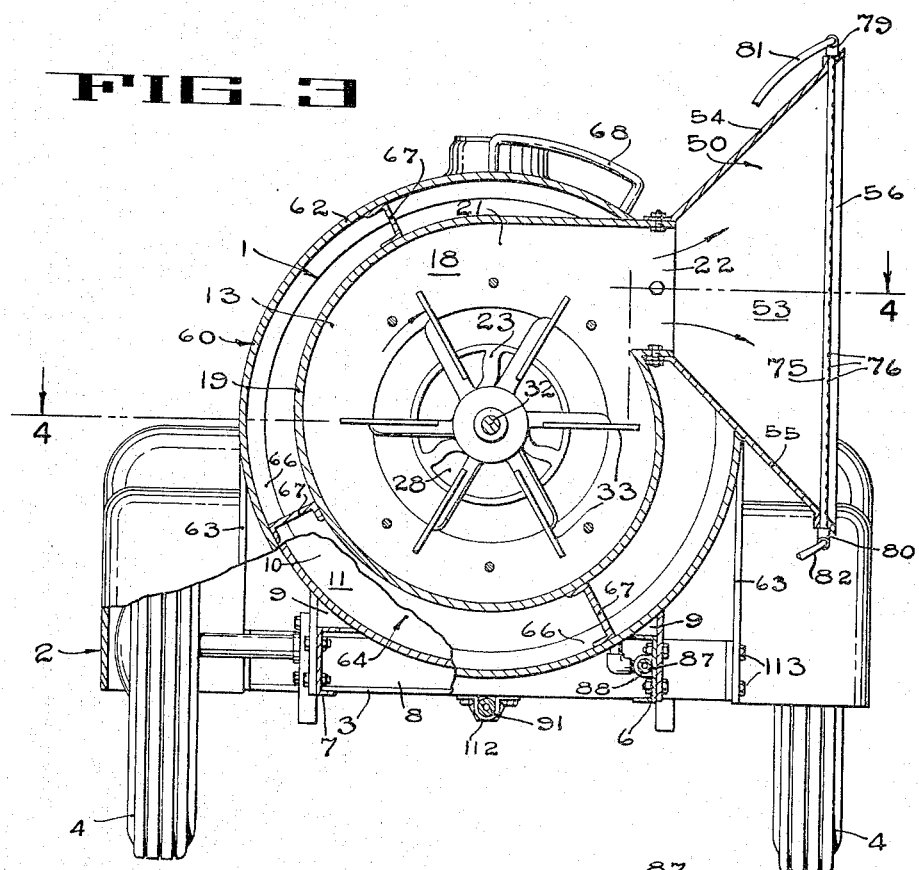
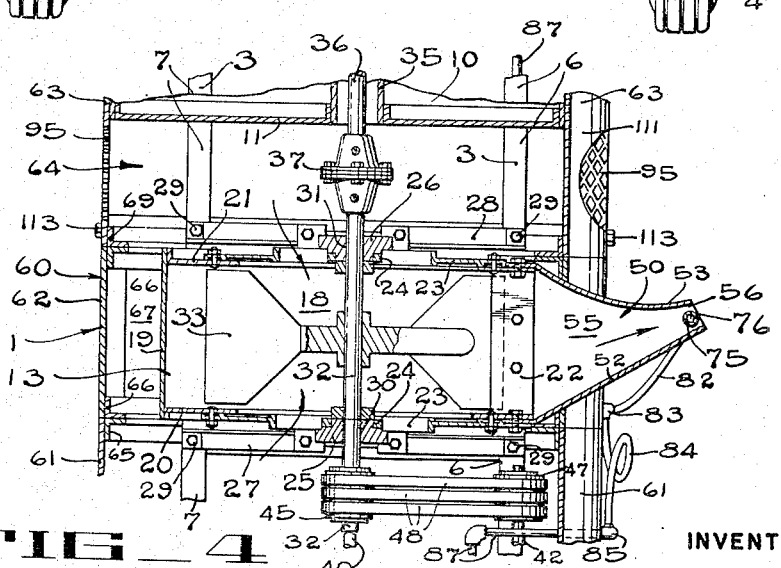

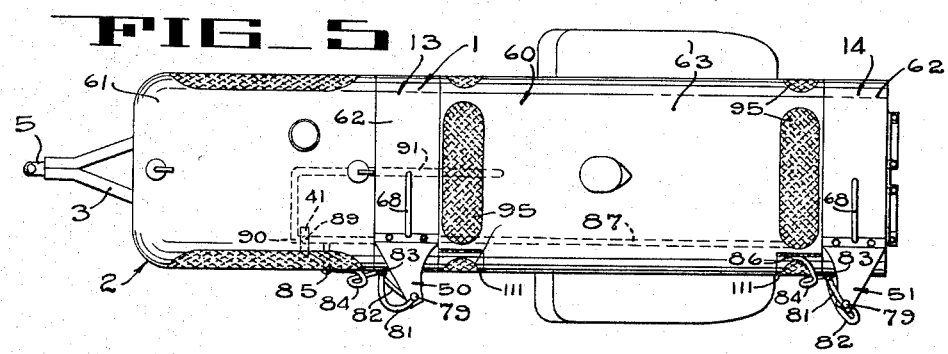

Aug. 24, 1954 V. H. MATTHEWS 2,686,990
METHOD OF HORTICULTURAL SPRAYING OR DUSTING
Filed June 2, 1949 4 Sheets-Sheet 4
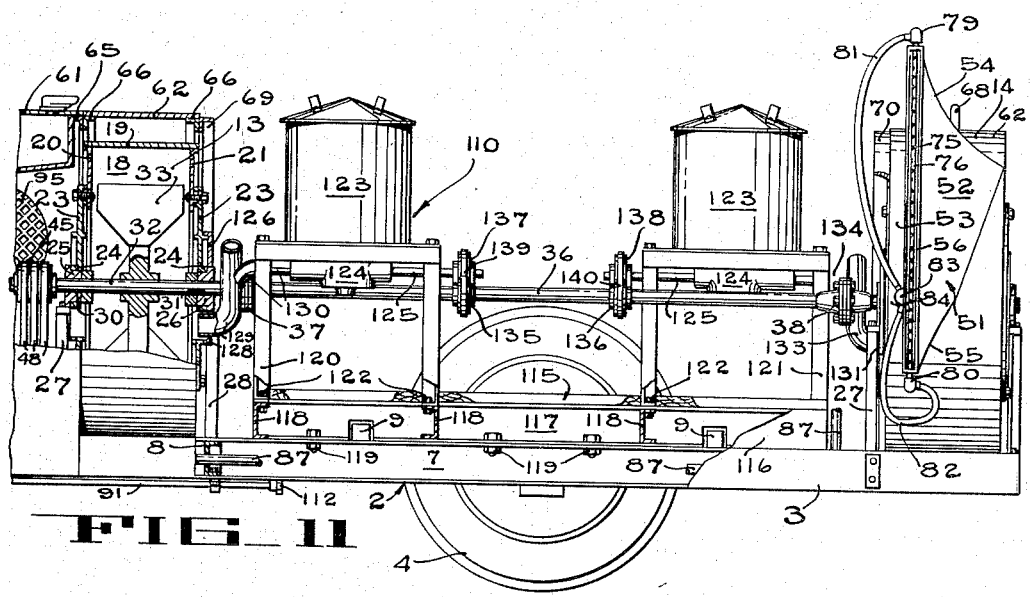
INVENTOR
VINTON H. MATTHEWS
BY Hans G. Hoffmeister
ATTORNEY Patented Aug. 24, 1954

2,686,990

UNITED STATES PATENT OFFICE 2,686,990

METHOD OF HORTICULTURAL SPRAYING OR DUSTING

Vinton H. Matthews, San Jose, Calif., assignor to Food Machinery and Chemical Corporation, San Jose, Calif., a corporation of Delaware Application June 2, 1949, Serial No. 96,782

5 Claims. (Cl. 47—58)

1

This invention appertains to spraying or dusting and relates more particularly to a method of horticultural spraying or dusting.

It is one object of the present invention to provide a method for spraying or dusting trees.

Another object is to provide a method for sequentially turning the branches, limbs, and leaves of the tree from one side to another simultaneously with the application of spraying or dusting material to the branches, limbs, and leaves of the tree.

Another object is to provide a method of applying spraying or dusting material to a tree by entraining such material in blasts of air directed toward the limbs, branches, and leaves of the tree in a manner to effect simultaneous bending and spraying of the limbs, branches, and turning of the leaves whereby to deposit particles of spraying or dusting material on all their surfaces.

Another object is to provide a mobile apparatus for directing a plurality of converging blasts of spraying and/or dusting material converging toward a tree for effecting a turbulence in the foliage of the tree while progressively bending the branches and turning the leaves thereof first in one direction and then in the opposite direction for subjecting all surfaces of such branches and leaves to an application of spraying or dusting material.

Another object of the present invention is to provide an apparatus for directing a plurality of blasts of air loaded with fungicide or insecticide laterally toward trees planted in rows as the apparatus moves parallel to the row of trees, and converging such blasts so that they meet approximately at or beyond the line of the trunks of the trees of such row for effecting sequential bending of the branches of each tree forth and back to prevent shingling or overlapping of leaf upon leaf and branch upon branch during the application of spraying or dusting material to the foliage of the tree.

Another object is to provide a mobile spraying apparatus for directing spraying material from a plurality of nozzles spaced from each other and discharging the spraying material in converging streams meeting at a predetermined distance from the apparatus to create a turbulence in the foliage of the tree as the apparatus passes the same.

Another object is to provide adjustable nozzles for a mobile blower apparatus for directing spraying material in converging paths from either one or the other side of the apparatus.

2

These and other objects and advantages of the present invention will become more apparent in connection with the following description and drawings in which:

Fig. 1 is a side view of the spraying apparatus of the present invention.

Fig. 2 is an enlarged longitudinal section of the apparatus shown in Fig. 1.

Fig. 3 is an enlarged cross section of Fig. 1 taken along line 3—3 thereof.

Fig. 4 is a fragmentary horizontal section of the apparatus taken along line 4—4 in Fig. 3.

Fig. 5 is a top view of the mobile spraying apparatus of Fig. 1.

Figs. 6 through 10 are diagrammatic views of the spraying apparatus sequentially illustrating the effect of the blasts of spraying material on the branches of a tree as the vehicle passes the tree.

Fig. 11 is a side view similar to Fig. 2 illustrating a modified form of apparatus embodying the present invention.

Fig. 12 is a top view of the apparatus shown in Fig. 11.

The spraying apparatus of the present invention is generally indicated by reference numeral 1 in the drawings and comprises a trailer or vehicle 2 having a frame 3 mounted on wheels 4 and having a tongue 5 by which the trailer can be hitched to a tractor, not shown, and be drawn thereby between rows of trees in an orchard.

The frame 3 comprises parallel channels 6 and 7 joined by cross beams 8 and having pillow blocks 9 thereon for supporting a tank 10 between the wheels 4, as is shown in Figs. 2 and 3. Mounted on the frame 3 in spaced relation to the front and rear end walls 11 and 12 of the tank are front and rear blowers 13 and 14, respectively. For purposes of illustration, the blowers 13 and 14 employed in the present disclosure are of a type similar to the one described and shown in Patent No. 2,321,792, issued to A. St. John Bowie, June 15, 1943.

The blowers 13 and 14 are especially designed for applying spraying and/or dusting material to plants in a particular manner as contemplated by the invention herein. Accordingly, each blower comprises a housing 18 having an annular wall 19 secured to annular flanges of spaced side walls 20 and 21 and provided with a discharge conduit 22, Figs. 3 and 4. The spaced side walls 20 and 21 are each provided with a central spider casting 23 having a bearing 24. The bearing 24 on the side wall 20 is rotatably mounted on a trunnion carriage 25 and the bearing on the side wall 21 on a trunnion carriage 26. Each trunnion carriage 25 and 26 is supported on spaced brackets 27 and 28, respectively, disposed adjacent the side walls of the housing 18 and secured by bolts 29 to the frame 3. The trunnion carriages 25 and 26 are provided with aligned bearings 30 and 31, respectively, which rotatably support a shaft 32 having a propeller 33 secured thereto for rotation therewith.

The shafts 32 of the two blowers are in axial alignment with each other, see Fig. 2, and the tank 10 is provided with a tubular passage 35 from end to end thereof in axial alignment with the blower shafts. The shafts 32 are connected to the respective ends of a jack shaft 36 extending through the passage 35 and having its ends joined to both front and rear shafts 32 preferably by couplings 37 and 38 disposed within the spaces between the end walls of the tank and the blowers.

The shaft 32 of the front blower 13 extends forwardly of the housing thereof and is adapted to be connected to any suitable power take-off unit. In the present disclosure it is preferred that the shaft 32 be connected to a self-contained power unit in the form of an internal combustion engine 39 mounted in conventional manner on the frame 3 forwardly of the blower 13. The engine 39 is provided with a drive shaft 40 disposed parallel to and adjacent the forward extension of the shaft 32 of the front blower 13. Secured to the frame 3 adjacent the engine 39 is a liquid pump 41 having a shaft 42 extending parallel to and adjacent the drive shaft 40 of the engine as well as the shaft 32 of the front blower 13. Secured to each of these shafts 32, 40, and 42 is a gang pulley 45, 46, and 47, respectively, and trained around these pulleys are a plurality of belts 48 whereby the shafts 42 and 32 are driven from the drive shaft 40 when the engine 39 is in operation.

Secured to the discharge conduit 22 of the front blower 13 is a discharge nozzle 50 and secured to the discharge conduit 22 of the rear blower 14 is a discharge nozzle 51. Each of the nozzles 50 and 51 comprises curved converging side walls 52 and 53 (Fig. 4) and diverging upper and lower end walls 54 and 55 (Fig. 3) forming an elongated or rectangular orifice 56. The nozzle 50 of the front blower 13 is disposed angularly toward the rear of the vehicle while the nozzle 51 of the rear blower 14 is disposed angularly toward the front end thereof, i. e., each nozzle is preferably disposed at an angle of approximately 60 degrees with respect to the longitudinal axis of the vehicle so that the blasts of air emanating from these nozzles will be directed in converging paths meeting with each other a substantial distance either laterally or vertically of the vehicle, as the case may be.

The apparatus is provided with a body 60 comprising a hood 61 disposed over the engine 39; an annular cover 62 for each of the blowers 13 and 14 and a central portion 63 for covering the tank 10 and the spaces between the ends of the tank and the respective blowers to provide ducts 64 for supplying air to the blowers.

The rearward end of the hood 61 is supported on and secured to a frame 65 extending upwardly from the frame 3 and abutting against an annular frame 66, Fig. 3, secured by blocks 67 to the forward blower housing for rotation with the same concentrically of the shaft 32 thereof. The annular cover 62 surrounding the forward blower 13 is secured to the frame 66 thereof for rotation therewith whereby the nozzle 50 may be directed to either one or the other side of the apparatus, there being a suitable handle 68 secured to the cover 62 for facilitating manipulation of the same and the blower housing in the manner explained.

The opposite side of the frame 66 of the front blower 13 abuts against a frame member 69 secured to the vehicle frame 3. This frame member 69 supports the forward end of the central portion 63 of the body 60, as is shown in Fig. 4, while the rearmost end of the central portion 63 is secured to a frame member 70 bolted to the vehicle frame 3 and abutting against the annular frame 66' of the rear blower 14. The annular cover 62 of the rear blower 14 is secured to the frame 66' in the same manner as explained in connection with the forward blower 13 and is provided with a handle 68 for facilitating rotation of the blower 14 relative to the vehicle in the same manner as hereinbefore stated in connection with the front blower 13.

Mounted within the orifice 56 of each nozzle 50 and 51 and extending the length of the respective orifice is a liquid supply pipe 75 having a plurality of liquid discharge apertures 76. The free ends of the liquid supply pipes 75 extend through the upper wall 54 and lower wall 55 of the respective nozzle, the upper end of each pipe being provided with pipe fitting 79 and the lower end of each pipe being provided with a fitting 80. Secured to the pipe fittings 79 and 80 associated with each nozzle are conduits 81 and 82, respectively, which are preferably flexible members having their opposite ends connected to a T fitting 83 in turn connected to a flexible hose 84.

The flexible hose 84 associated with the front blower 13 is connected to a fitting 85 extending through the hood 61 and the flexible hose 84 associated with the rear blower 14 is connected to a fitting 86 extending through the central portion 63 of the body. Within the body portion each of the fittings 85 and 86 is connected to the upper ends of vertical portions of a feed pipe 87, the main portion of which extends longitudinally of the frame 3 and is secured to the channel 6 thereof by straps 88, as is shown in Fig. 3.

The housing of the liquid pump 41, Fig. 2, is provided with an inlet and an outlet opening, each of which is provided with a threaded fitting 89 and 90, respectively. The feed pipe 87 has its forward end threadedly connected to the fitting 90 at the outlet opening of the liquid pump 41. Threadedly secured to the fitting 89 at the inlet opening of the liquid pump is a pipe line 91 having its opposite end threadedly connected to a nipple 92 communicating with the tank 10, as is clearly shown in Fig. 2.

When the engine 36 is in operation, as hereinbefore explained, the shafts 32 of the blowers 13 and 14 are driven in unison causing the propellers 33 thereof to rotate within their respective housings to discharge air therefrom through the nozzles 50 and 51. Each of the blowers 13 and 14 is supplied with air through the openings provided by the spider castings 23 in the side walls thereof, the body 60 being provided with suitable grills 95 through which air freely passes into the interior of the body 60 toward the side walls of the blower.

The blasts of air emanating from the nozzles 50 and 51 are directed angularly from the vehicle for confluence a substantial distance laterally thereof, as hereinbefore explained, and either spraying or dusting material may be carried by the separate blasts for application to the trees. In the preferred embodiment disclosed in Figs. 1 to 10, inclusive, liquid spraying material is introduced into the air stream emanating from the blowers, which liquid spraying material is stored in the tank 10 and is supplied to the pump 41 by way of the pipe line 91. The spraying material is discharged from the pump through the feed line 87 and thence by way of the flexible conduits 84, 82, and 81 into each of the liquid supply pipes 75 disposed in the orifices 56 of the respective nozzles 50 and 51. The liquid discharges from the supply pipe 75 through the apertures 76 thereof in a plurality of fine streams and is picked up by the blast of air emanating from the respective nozzle whereby the liquid is atomized into a mist which is directed in a fan shaped pattern toward the leaves, limbs, and trunk of the tree as the apparatus passes the same.

The effect of the converging blasts of spraying material during operation of the apparatus of the present invention is best illustrated in connection with Figs. 5 to 10, inclusive, in which it is assumed that the spraying apparatus is drawn in the direction of the arrow 96 along a path which is spaced from the tree sufficient to cause the converging blasts emanating from the two blower nozzles to meet at or slightly beyond the trunk of the tree when the vehicle is directly opposite the same, see Fig. 8.

Figs. 6 to 10, inclusive, illustrate five sequential steps during the progress of the apparatus past the same tree, that is to say, in Fig. 6 the apparatus is shown approaching the tree, the converging blasts from the two nozzles being directed toward the leaves of the right side of the tree; in Fig. 7 the vehicle has progressed so that the converging blasts are directed into the branches on the right side of the tree; in Fig. 8 the two blasts meet at or beyond the trunk of the tree; in Fig. 9 the converging blasts strike the branches on the left side of the tree; and in Fig. 10 the apparatus is being drawn away from the tree, the converging blasts striking the leaves on the extreme left side thereof.

For explanatory purposes, the tree exemplified in Figs. 6 through 10 is provided with four limbs on that side thereof adjacent the path of the spraying apparatus. The first limb to be struck by spraying material, Fig. 6, is identified by reference numeral 100, and reading counterclockwise about the trunk of the tree, the second limb comprises two branches 101 and 102, the third limb two branches 103 and 104, and the fourth limb identified by reference numeral 105.

As the spraying apparatus progresses relative to the tree, the blast from the front blower 50 strikes the leaves at the extreme end of the first limb 100 and gradually turns the leaves and twigs thereof in a clockwise direction. Subsequently, the blast from the rear nozzle 51 is directed into the cluster of twigs and leaves of the first limb 100 turning them in a counterclockwise direction and applying spraying material to the back sides of such twigs and leaves. The blast from the front nozzle 50, in the meantime, strikes the leaves at the extreme end of the branch 101 of the second limb, eventually bending the branch 101 clockwise and then striking the leaves at the extreme end of the branch 102, as shown in Fig. 6.

As the vehicle progresses from the position shown in Fig. 6 to that of Fig. 7, the blast from the front blower 50 passes the extreme end of the branch 102, turning the same clockwise while the blast begins to strike the leaves at the end of the branch 103. During such progress of the front nozzle 50, the blast from the rear nozzle 51 has passed the extreme end of the first limb 100 and is directed between the latter and the second branch of the tree. The branches 101 and 102, as stated above, have been bent clockwise by the blast from the forward blower and, therefore, the leaves at the extreme end of the branch 101 are disposed in the path of the blast from the rear nozzle, as is shown in Fig. 7.

In the advancement of the apparatus from the position of Fig. 7 to that of Fig. 8, the blast of the rear blower 51 passes the end of the branch 101 as the blast from the forward blower 50 passes the end of the branch 103. Consequently, the branch 102 is no longer in the line of force of the blast from the front nozzle 50, and, therefore, will return by its own resiliency toward its normal position as the blast from the rear nozzle 51 is directed between the branches 101 and 102. At the same time, the blast from the forward blower nozzle 50 is directed between the branches 103 and 104 and, as illustrated in Fig. 8, the converging blasts from the two blowers meet substantially at the center, i. e., the trunk, of the tree.

Proceeding now from the position of the apparatus in Fig. 8 to the position shown in Fig. 9, the blast from the rear nozzle 51 bends the branch 102 counterclockwise while the blast of the front nozzle 50 sweeps outwardly relative to the side of the branch 104 turning the branch 104 counterclockwise, Fig. 9.

Progression of the apparatus from the position shown in Fig. 9 to that illustrated in Fig. 10 causes the blast from the rear nozzle 51 to pass the extreme end of the branch 102 releasing the branch 102 for return to its natural position as the blast strikes the side of the branch 103 to turn the branch 103 counterclockwise, as is shown in Fig. 10. At the same time, the blast from the forward nozzle 50 passes the end of the branch 104, and is directed between the branch 104 and the limb 105 to sweep outwardly relative to the side of the limb 105 turning the latter counterclockwise as is shown in Fig. 10. As the vehicle moves from the position shown in Fig. 10 away from the tree, the force of the converging blasts from the two nozzles gradually lessens so that the twigs and leaves at the extreme end of the branches 103, 104 of the third limb and at the end of the limb 105 are successively released from the forces of the blasts and said branches and limbs therefore sequentially return to their natural position one after another.

In connection with the foregoing description of the effect of the converging blasts on the particular tree illustrated, it should be understood that the converging blasts cause a turbulence in the fine particles of spraying or dusting material thereby creating a cloud of spraying material in and around the limbs of the tree. The force of such converging blasts also causes a turbulence of the twigs and leaves of the tree such that they will wave and swirl about in the turbulent cloud of spraying material. Consequently, the fine particles of the spraying material are brought into contact with and deposited upon the leaves, twigs, branches, and limbs so that all surfaces of the foliage receive an application of the spraying material. Moreover, incidental to the application of the spraying material to the foliage on that side of the tree facing the spraying apparatus, a portion of the same cloud of spraying material is forced beyond the trunk of the tree causing an application of the fine particles thereof to the trunk side or inner portions of the branches, limbs, and leaves on the far side of the tree, namely, that side of the tree facing away from the spraying apparatus.

When the spraying apparatus reaches the end of a row of trees in an orchard, it is drawn around the last tree of the row for a return run past the opposite side of such row so that the converging blasts will be directed toward the opposite sides of the trees thereof, and the foregoing procedure is repeated. Consequently, the entire foliage of each tree will receive a thorough application of the spraying material and will be adequately protected against pestilence.

As hereinbefore explained, the housings of the blowers 13 and 14 are rotatable so that their nozzles may be directed to either one or the other side of the apparatus. This feature is especially adapted for young orchards in which the trees are small. In other words, when one row of such trees has been sprayed and the vehicle is returned on the opposite side of such row, the blowers can be rotated into a position so as to have one blower discharge to one side of the vehicle, and the other blower to discharge to the opposite side thus applying material to two adjacent tree rows.

The feature of rotatability of the blower housings is further advantageous in cases where the foliage of the tree has attained considerable height. In such cases, the nozzles can be tilted to any desired degree upwardly so that the converging blasts are directed at a proper angle, to adequately apply spraying material to the foliage of such trees, as hereinbefore explained.

Figs. 11 and 12 illustrate the invention modified by conversion into a duster or dust applicator. The conversion of the apparatus from a sprayer to a duster is accomplished by removing the storage tank 10 and substituting therefor dust supplying units 110.

The removal of the tank 10 will be best understood in connection with Figs. 1 to 4 wherein it will be noted that the central body portion 63 is provided with access panels 111 at each of the air ducts 64. The panels 111, when removed, permit access to the couplings 37 and 38 between the jack shaft 36 and the shafts 32 of the two blowers whereby the jack shaft can be uncoupled from the blower shafts. The pipe line 91 leading from the tank 10 is provided with a union 112, Fig. 2, which union is disconnected as are the body bolts 113, Fig. 1, for the central body portion 63. Thereafter, the tank 10 and central body portion are lifted from the frame 3 and the duster unit 110 lowered in place.

The duster unit 110 (Figs. 11 and 12) comprises a platform 115 having parallel channels 116, 117 spaced from each other by cross channels 118 so as to rest upon the channels 6 and 7, respectively, of the frame 3. The channels 116 and 117 are then secured to the respective channels 6 and 7 by bolts and nuts 119.

Secured to the platform 115, at diagonally opposite corners thereof, are front and rear pedestals 120 and 121, the legs of each pedestal being suitably secured to the platform by bolts 122, Fig. 11. Each pedestal supports a hopper 123 adapted to receive a quantity of finely divided dusting material, such as sulphur or like insecticide or fungicide, and has an opening, not shown, in its lower wall for discharging the dust into a housing 124 secured thereto. Within each housing 124 is a screw feed, not shown, associated with a drive shaft 125 which is disposed parallel to the longitudinal axis of the apparatus.

Secured to the spider casting 23 on the side wall 21 of the front blower is a plate 126 having an opening 128 in which is disposed the discharge end of an air duct 129 having its opposite end open to atmosphere and extending laterally and upwardly to one side of the apparatus. Communicating with this air duct 129, between the ends thereof, is a conduit 130 having its opposite end in communication with the discharge side of the screw feed housing 124 beneath the forward hopper. Secured to the spider casting 23 on the side wall 20 of the rear blower housing is a plate 131 having an opening, not shown, into which extends the discharge end of an air duct 133 having its opposite end open to atmosphere and extending upwardly and outwardly relative to the apparatus. The air duct 133 is provided with an opening between its ends communicating with a conduit 134 extending to and communicating with the housing 124 of the screw feed of the rear hopper 123.

The jack shaft 36 is withdrawn from the tubular passage 35 in the tank 10 and a pair of pulleys 135 and 136 are secured at predetermined positions between the ends of the jack shaft. The jack shaft is again connected to the ends of the shafts 32 of both blowers by the couplings 37 and 38, see Figs. 11 and 12. Secured to each of the drive shafts 125 of the two screw feeds is a drive pulley 137 and 138, respectively, in alignment, transversely of the apparatus, with the pulleys 135 and 136 secured to the jack shaft. The pulleys 135 and 137 associated with the drive shaft 125 of the front pedestal 120 are drivingly connected by a belt 139 and the pulleys 136 and 138 associated with the rear pedestal 121 are drivingly connected by a belt 140.

The drive shafts 32 of the front and rear blowers are driven in the same manner as hereinbefore explained in connection with the preferred embodiment of the invention to drive the propellers 33 thereof in unison. Since the shafts 125 of the two screw feeds are driven directly from the jack shaft 36, the rate of rotation of the screw feed drive shafts is dependent upon the speed of rotation of the blowers. Consequently, the volume of dust dispensed from the respective hoppers 123 into the air ducts 129 and 133 will be in proportion to the volume of the air drawn therethrough by the propellers. The dust thus discharged into the air ducts 129 and 133 is drawn in metered quantities into the respective blower housings and is entrained in a stream of air discharging from the housings through the conduits 22 and the discharge nozzles 50 and 51.

The converging blasts of air and dust emanating from the nozzles 50 and 51 meet a substantial distance laterally of the apparatus as hereinbefore explained in connection with the preferred embodiment of the invention, and, therefore, the effect of the blasts upon a tree is the same as explained in connection with Figs. 6 to 10, inclusive, effecting an application of dust to all sides and surfaces of the foliage of the trees.

Having thus described the apparatus for and method of applying fungicide or insecticide to the foliage of a tree, I desire it to be understood that the invention is not limited to the specific mode and practice of the method as disclosed or the precise details of construction illustrated herein, but that various modes of application and/or modifications, and variations in structure may be resorted to without departing from the spirit or scope of the invention, and I deem myself entitled to all such modes of application and structural modifications or variations as come within the purview of the appended claims.

What I claim as new and desire to protect by Letters Patent is:

1. The method of applying pesticide material to a tree comprising entraining finely divided particles of pesticide material in converging blasts and directing such blasts into the foliage of a tree to converge interiorly of the tree while moving them past the tree, said blasts being directed toward the tree from points spaced one ahead of the other in the direction of movement thereby displacing the foliage successively in different directions and creating a turbulence in the foliage of the tree so that the entire surfaces of such foliage receive a deposit of the pesticide material.

2. The method of applying pesticide material to a tree comprising entraining fine particles of pesticide material in blasts directed in converging paths into the foliage of a tree, and moving such blasts in unison past the tree, said blasts being directed toward the tree from points spaced horizontally in a plane paralleling the direction of movement thereby displacing the foliage first in one direction and then in the opposite direction and simultaneously causing a turbulence of the fine particles of pesticide material and a turbulence of the branches and leaves of the tree whereby all surfaces of such branches and leaves are exposed to the turbulently moving particles of pesticide material such that the latter are deposited on all surfaces of the branches and leaves.

3. The method of applying pesticide material to a row of trees comprising entraining the pesticide material in converging blasts of air directed toward the row from points spaced longitudinally of the row at one side thereof meeting within the foliage of the tree, and moving such converging blasts of air past each tree causing the branches and leaves thereof to be turned first in one direction and then in an opposite direction thereby subjecting all surfaces of such limbs and leaves to an application of such pesticide material.

4. The method of applying pesticide material to a tree comprising entraining pesticide material in substantially horizontally directed vertically spreading blasts of air directed from points relatively widely spaced in a horizontal direction at one side of the tree along converging paths meeting within the foliage of the tree, moving such blasts of air in unison past the tree causing the branches thereof to be turned first in one direction by the leading blast of air and then in an opposite direction by the trailing blast of air to thereby wave the branches and leaves of the tree to and fro in the pesticide material.

5. The method of applying pesticide material to a tree comprising entraining pesticide material in relatively thin fan shaped blasts widely spreading in vertical planes converging from sources widely spaced in a horizontal direction in a plane spaced from one side of the tree, moving such converging fan shaped blasts of air past the tree causing the branches thereof to turn first in one direction and then in the opposite direction and simultaneously creating a turbulent fluttering of the twigs and leaves of such branches so that all surfaces of the branches, twigs, and leaves of the tree will receive an application of pesticide material entrained in such blasts of air.

References Cited in the file of this patent

UNITED STATES PATENTS

| Number | Name | Date |
| --- | --- | --- |
| 668,950 | Brakeley | Feb. 26, 1901 |
| 1,783,430 | Johnson | Dec. 2, 1930 |
| 1,864,198 | Johnson | June 21, 1932 |
| 1,980,427 | Parker | Nov. 13, 1934 |
| 1,993,635 | Towt | Mar. 5, 1935 |
| 1,998,856 | Towt | Apr. 23, 1935 |
| 2,220,082 | Daugherty | Nov. 5, 1940 |
| 2,297,110 | Parker | Sept. 29, 1942 |
| 2,327,204 | McLemore | Aug. 17, 1943 |
| 2,408,328 | McLemore | Sept. 24, 1946 |
| 2,608,441 | Daugherty | Aug. 26, 1952 |

FOREIGN PATENTS

| Number | Country | Date |
| --- | --- | --- |
| 494,949 | France | June 13, 1919 |
| 558,502 | Great Britain | May 28, 1947 |